(12) United States Patent
Washio et al.

(10) Patent No.: US 8,731,926 B2
(45) Date of Patent: May 20, 2014

(54) SPOKEN TERM DETECTION APPARATUS, METHOD, PROGRAM, AND STORAGE MEDIUM

(75) Inventors: Nobuyuki Washio, Kawasaki (JP); Shouji Harada, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 168 days.

(21) Appl. No.: 13/039,495

(22) Filed: Mar. 3, 2011

(65) Prior Publication Data

US 2011/0218805 A1   Sep. 8, 2011

(30) Foreign Application Priority Data

Mar. 4, 2010  (JP) ................................. 2010-048179

(51) Int. Cl.
   *G10L 15/28*   (2013.01)
   *G10L 15/26*   (2006.01)
   *G10L 15/06*   (2013.01)
   *G10L 15/04*   (2013.01)
   *G10L 21/00*   (2013.01)

(52) U.S. Cl.
   USPC ........... 704/251; 704/235; 704/243; 704/246; 704/255; 704/270; 704/270.1; 704/275

(58) Field of Classification Search
   USPC ......... 704/251, 252, 253, 254, 235, 243, 270, 704/270.1, 275, 246, 255
   See application file for complete search history.

(56) References Cited

U.S. PATENT DOCUMENTS

| | | | | |
|---|---|---|---|---|
| 5,218,668 A | * | 6/1993 | Higgins et al. | 704/200 |
| 5,230,023 A | * | 7/1993 | Nakano | 381/110 |
| 5,432,886 A | | 7/1995 | Tsukada et al. | |
| 5,566,272 A | * | 10/1996 | Brems et al. | 704/231 |
| 5,625,748 A | * | 4/1997 | McDonough et al. | 704/251 |
| 5,684,925 A | * | 11/1997 | Morin et al. | 704/254 |
| 5,710,864 A | * | 1/1998 | Juang et al. | 704/238 |
| 5,717,826 A | * | 2/1998 | Setlur et al. | 704/252 |
| 5,737,724 A | * | 4/1998 | Atal et al. | 704/251 |

(Continued)

FOREIGN PATENT DOCUMENTS

| | | |
|---|---|---|
| JP | 04-255900 | 9/1992 |
| JP | 05-334861 | 12/1993 |

(Continued)

OTHER PUBLICATIONS

Weifeng Li; Billard, A. ; Bourlard, H. , Keyword Detection for Spontaneous Speech, Oct. 2009, IEEE, Image and Signal Processing, 2009. CISP '09. 2nd International, pp. 1-5.*

*Primary Examiner* — Edgar Guerra-Erazo
(74) *Attorney, Agent, or Firm* — Fujitsu Patent Center

(57) ABSTRACT

A spoken term detection apparatus includes: processing performed by a processor includes a feature extraction process extracting an acoustic feature from speech data accumulated in an accumulation part and storing an extracted acoustic feature in an acoustic feature storage, a first calculation process calculating a standard score from a similarity between an acoustic feature stored in the acoustic feature storage and an acoustic model stored in the acoustic model storage part, a second calculation process for comparing an acoustic model corresponding to an input keyword with the acoustic feature stored in the acoustic feature storage part to calculate a score of the keyword, and a retrieval process retrieving speech data including the keyword from speech data accumulated in the accumulation part based on the score of the keyword calculated by the second calculation process and the standard score stored in the standard score storage part.

11 Claims, 14 Drawing Sheets

(56) References Cited

U.S. PATENT DOCUMENTS

| | | | |
|---|---|---|---|
| 5,774,858 A * | 6/1998 | Taubkin et al. | 704/273 |
| 5,797,123 A * | 8/1998 | Chou et al. | 704/256.5 |
| 5,799,273 A * | 8/1998 | Mitchell et al. | 704/235 |
| 5,842,163 A * | 11/1998 | Weintraub | 704/240 |
| 5,960,447 A * | 9/1999 | Holt et al. | 715/201 |
| 6,125,345 A * | 9/2000 | Modi et al. | 704/240 |
| 6,230,129 B1 * | 5/2001 | Morin et al. | 704/254 |
| 6,233,555 B1 * | 5/2001 | Parthasarathy et al. | 704/249 |
| 6,292,778 B1 * | 9/2001 | Sukkar | 704/256.4 |
| 6,321,195 B1 | 11/2001 | Lee et al. | |
| 6,434,520 B1 * | 8/2002 | Kanevsky et al. | 704/243 |
| 6,434,521 B1 | 8/2002 | Barnard | |
| 6,487,532 B1 * | 11/2002 | Schoofs et al. | 704/251 |
| 6,571,210 B2 * | 5/2003 | Hon et al. | 704/251 |
| 7,472,066 B2 * | 12/2008 | Kuo et al. | 704/266 |
| 7,617,101 B2 * | 11/2009 | Chang et al. | 704/232 |
| 7,725,318 B2 * | 5/2010 | Gavalda et al. | 704/251 |
| 7,996,218 B2 | 8/2011 | Kim et al. | |
| 8,311,828 B2 * | 11/2012 | Arrowood et al. | 704/254 |
| 2003/0004721 A1 * | 1/2003 | Zhou | 704/251 |
| 2004/0025180 A1 * | 2/2004 | Begeja et al. | 725/46 |
| 2004/0254795 A1 * | 12/2004 | Fujii et al. | 704/277 |
| 2008/0059193 A1 * | 3/2008 | Huang et al. | 704/260 |
| 2008/0120107 A1 * | 5/2008 | Harada | 704/251 |
| 2009/0030680 A1 * | 1/2009 | Mamou | 704/235 |
| 2009/0030894 A1 * | 1/2009 | Mamou et al. | 707/5 |
| 2009/0043581 A1 * | 2/2009 | Abbott et al. | 704/254 |
| 2009/0112593 A1 * | 4/2009 | Konig et al. | 704/251 |
| 2009/0150148 A1 * | 6/2009 | Abe | 704/243 |
| 2010/0088098 A1 * | 4/2010 | Harada | 704/254 |
| 2011/0173000 A1 * | 7/2011 | Yamamoto et al. | 704/240 |

FOREIGN PATENT DOCUMENTS

| | | |
|---|---|---|
| JP | 6-175698 | 6/1994 |
| JP | 2808906 | 10/1998 |
| JP | 11-202890 | 7/1999 |
| JP | 2000-259645 | 9/2000 |
| JP | 2002-221984 | 8/2002 |

* cited by examiner

FIG. 3

| POINTER | FEATURE VECTOR |
|---------|----------------|
| 1 | SPEECH 0001, FEATURE OF 1ST FRAME |
| 2 | SPEECH 0001, FEATURE OF 2ND FRAME |
| ⋮ | ⋮ |
| 1127622 | SPEECH 0001, FEATURE OF NTH FRAME |
| 1127623 | SPEECH 0002, FEATURE OF 1ST FRAME |
| ⋮ | ⋮ |

FIG. 4

| POINTER | STANDARD SCORE |
|---|---|
| 1 | SPEECH 0001, STANDARD SCORE OF 1ST FRAME |
| 2 | SPEECH 0001, STANDARD SCORE OF 2ND FRAME |
| ⋮ | ⋮ |
| 1127622 | SPEECH 0001, STANDARD SCORE OF NTH FRAME |
| 1127623 | SPEECH 0002, STANDARD OF NTH FRAME |
| ⋮ | ⋮ |

FIG. 5

| SPEECH ID | START POSITION POINTER | NUMBER OF FRAMES |
|---|---|---|
| 0001 | 1 | 1127622 |
| 0002 | 1127623 | 613411 |
| ⋮ | ⋮ | ⋮ |

SPOKEN TERM DETECTION APPARATUS, METHOD, PROGRAM, AND STORAGE MEDIUM

CROSS-REFERENCE TO RELATED APPLICATIONS

This application is based upon and claims the benefit of priority of the prior Japanese Patent Application No. 2010-48179, filed on Mar. 4, 2010, the entire contents of which are incorporated herein by reference.

FIELD

One embodiment relates to a spoken term detection apparatus, method, a program, and a storage medium.

BACKGROUND

There is a voice search technique for searching a part where a keyword is pronounced from stored speech data, such as a video, a voice mail, an answering machine, or the like. In this technology, even if a long speech is stored on speech data, it is important to quickly retrieve the part of interest with accuracy. JP 2002-221984 discusses a method for detecting speech data corresponding to a key word, where the speech data to be served as a retrieval target is converted into a phoneme series using an acoustic model in advance and a keyword is then converted into a phoneme series when detecting the keyword by speech to compare the phoneme series of the keyword with the phoneme series of the retrieval target by the dynamic programming (DP) matching.

SUMMARY

According to an aspect of the invention, a spoken term detection apparatus includes: a storage unit and a processor, wherein the storage unit includes an accumulation part to accumulate speech data of a retrieval target, an acoustic model storage section to store an acoustic model retaining a characteristic in an acoustic feature space for each recognition unit, an acoustic feature storage to store an acoustic feature extracted from the speech data, and a standard score storage part to store a standard score calculated from a similarity between the acoustic feature and the acoustic model, wherein processing performed by the processor includes a feature extraction process to extract acoustic features from speech data accumulated in the accumulation part and store an extracted acoustic features in the acoustic feature storage, a first calculation process to calculate a standard score from a similarity between an acoustic feature stored in the acoustic feature storage and an acoustic model stored in the acoustic model storage part, an acceptance process to accept an input keyword, a second calculation process to compare an acoustic model corresponding to an accepted keyword with the acoustic feature stored in the acoustic feature storage part to calculate a score of the keyword, and a retrieval process to retrieve speech data including the keyword from speech data accumulated in the accumulation part based on the score of the keyword calculated by the second calculation process and the standard score stored in the standard score storage part.

The object and advantages of the invention will be realized and attained at least by the elements, features, and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 3 is a schematic diagram illustrating a feature vector row;

FIG. 4 is a schematic diagram illustrating a standard score;

FIG. 5 is a schematic diagram illustrating a correspondence list for referring to features and standard scores;

DESCRIPTION OF EMBODIMENTS

Figure 1:
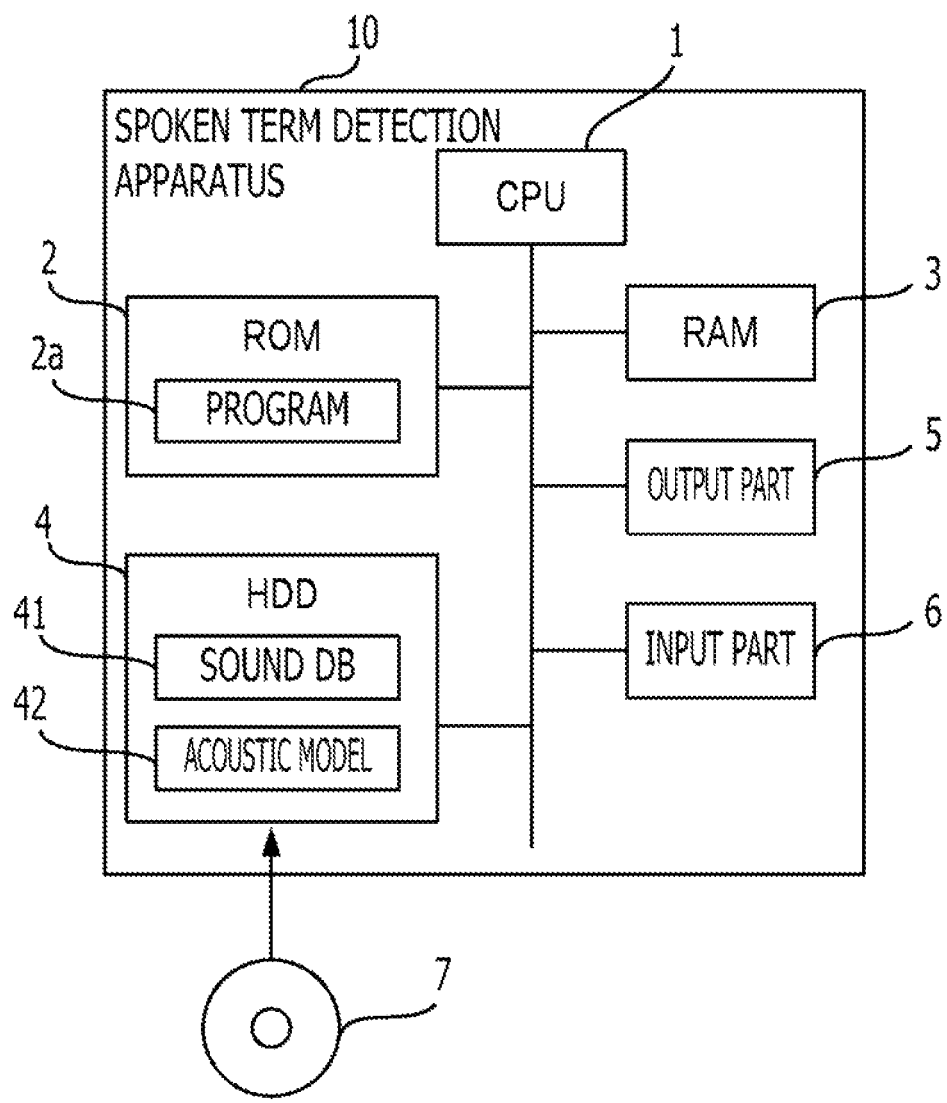
FIG. 1 is a block diagram illustrating an exemplary hardware configuration of a spoken term detection apparatus according to an embodiment.

The degeneration of information occurs due to processing of data into a recognized unit code series, such as the maximum likelihood phoneme series when converting speech data into a phoneme series using an acoustic model in advance. Thus, false detection or false rejection easily occur by a partial recognition error, causing a problem in that accurate retrieval cannot be performed. Furthermore, the use of an acoustic model defining more phonemes results in massive throughput, causing a problem in that the retrieval takes much time to complete.

One embodiment provides a spoken term detection apparatus which performs high-speed, precise spoken term detection, a spoken term detection method, a program, and a storage medium.

The spoken term detection apparatus includes a storage unit and a processor. The storage unit may be a main storage unit, such as a random access memory (RAM), or an auxiliary storage unit, such as a hard disk. The storage unit includes an accumulation part that accumulates speech data, an acoustic model storage section that stores an acoustic model, an acoustic feature storage part that stores acoustic features, and a standard score storage part that stores a standard score. The accumulation part accumulates speech data of a retrieval target. The acoustic model storage section retains characteristics in an acoustic feature space for each recognition unit. The acoustic feature storage stores acoustic features extracted from the speech data. The standard score storage part stores a standard score which is calculated from a similarity between the acoustic feature and the acoustic model. The processor performs a feature extraction process, a first calculation process, an acceptance process, a second calculation process, and a retrieval process. A feature extraction part performs the feature extraction process to extract acoustic features from the speech data accumulated in the accumulation part. A first calculation part performs the first calculation process to calculate a similarity between the acoustic feature stored in an acoustic feature storage and the acoustic model. A KW collating part performs the acceptance process to accept an input keyword. The KW collating part performs the second calculation process to calculate the score of the keyword by comparing the acoustic model corresponding to the keyword with an acoustic feature stored in the acoustic feature storage. The KW collating part performs the retrieval process to retrieve speech data which includes the keyword from the speech data accumulated in the accumulation part based on the score of the keyword calculated by the second calculation process and the standard score stored in the standard score storage.

According to an aspect of the spoken term detection apparatus, the similarity between the speech data of the retrieval target and the acoustic model is previously stored and a keyword is then retrieved using the similarity. In other words, since the similarity to be stored is independent from the keyword, the similarity may be calculated and stored before the retrieval of the keyword is performed. As a result, throughput in retrieving the keyword can be reduced. Therefore, it becomes possible to retrieve the keyword at high speed. In addition, the throughput may increase and affect on the speed of retrieval when calculating the similarity which can enhance the accuracy of retrieval. In contrast, the keyword retrieval can be performed more accurately by calculating the similarity in advance.

Hereinafter, the spoken term detection apparatus, the spoken term detection method, the program, and the storage medium will be described with reference to the drawings illustrating the respective embodiments. In the following description, the spoken term detection apparatus will be described as a personal computer (PC). Alternatively, it may be a personal digital assistant (PDA), a cell phone, or the like.

Embodiment

FIG. 1 is a block diagram illustrating an exemplary hardware configuration of a spoken term detection apparatus according to an embodiment.

A spoken term detection apparatus 10 is an apparatus for retrieving speech data, from which an input keyword is being pronounced, from accumulated speech data. The spoken term detection apparatus 10 includes individual hardware components, such as a central processing unit (CPU) 1, a read only memory (ROM) 2, a random access memory (RAM) 3, a hard disk drive (hereinafter, referred to as a HDD) 4, an output part 5, and an input part 6. These hardware components are connected to one another through a bus. The output part 5 may be, for example, a monitor or a speaker. The input part 6 may include a keyboard, a mouse, and a microphone.

The CPU 1 reads and executes a program previously stored in the ROM 2 or the HDD 4, while controlling the operation of the respective hardware components. The ROM 2 stores a program 2a for executing a process for allowing the spoken term detection apparatus 10 to be operated as a spoken term detection apparatus. Furthermore, the program 2a, various kinds of data, and so on may be stored in the HDD 4. Furthermore, the program 2a may be designed to be installed from an external storage medium 7, such as a CD-ROM or a DVD-ROM, into the HDD 4 and then executed by the CPU 1.

The RAM 3 may be, for example, a static RAM (SRAM), a dynamic RAM (DRAM), or a flash memory. The RAM 3 temporarily stores various kinds of data generated when the CPU 1 executes the program. The HDD 4 is a large-capacity storage device. The HDD 4 stores a speech data base (hereinafter, also referred to as a speech DB) 41, an acoustic model 42, and so on. The speech DB is an exemplary accumulation part. The speech DB 41 accumulates speech data which is input from a microphone in the input part 6 and served as a retrieval target. The speech DB 41 provides the speech data with speech IDs (0001, 0002, 0003, . . . ) in order of accumulation in time. The acoustic model 42 represents the acoustic feature (hereinafter, simply referred to as a feature) of frequency characteristics prepared for each unit of speech recognition, such as a phoneme, on the basis of average (standard) pronunciation data. The acoustic model 42 is stored in the HDD 4 in advance. The acoustic model 42 used may be any of a monophone model, a biphone model, and a triphone model.

Hereinafter, functions which can be realized in the spoken term detection apparatus 10 by allowing the CPU 1 to execute the program 2a stored in the ROM 2 will be described.

Figure 2:
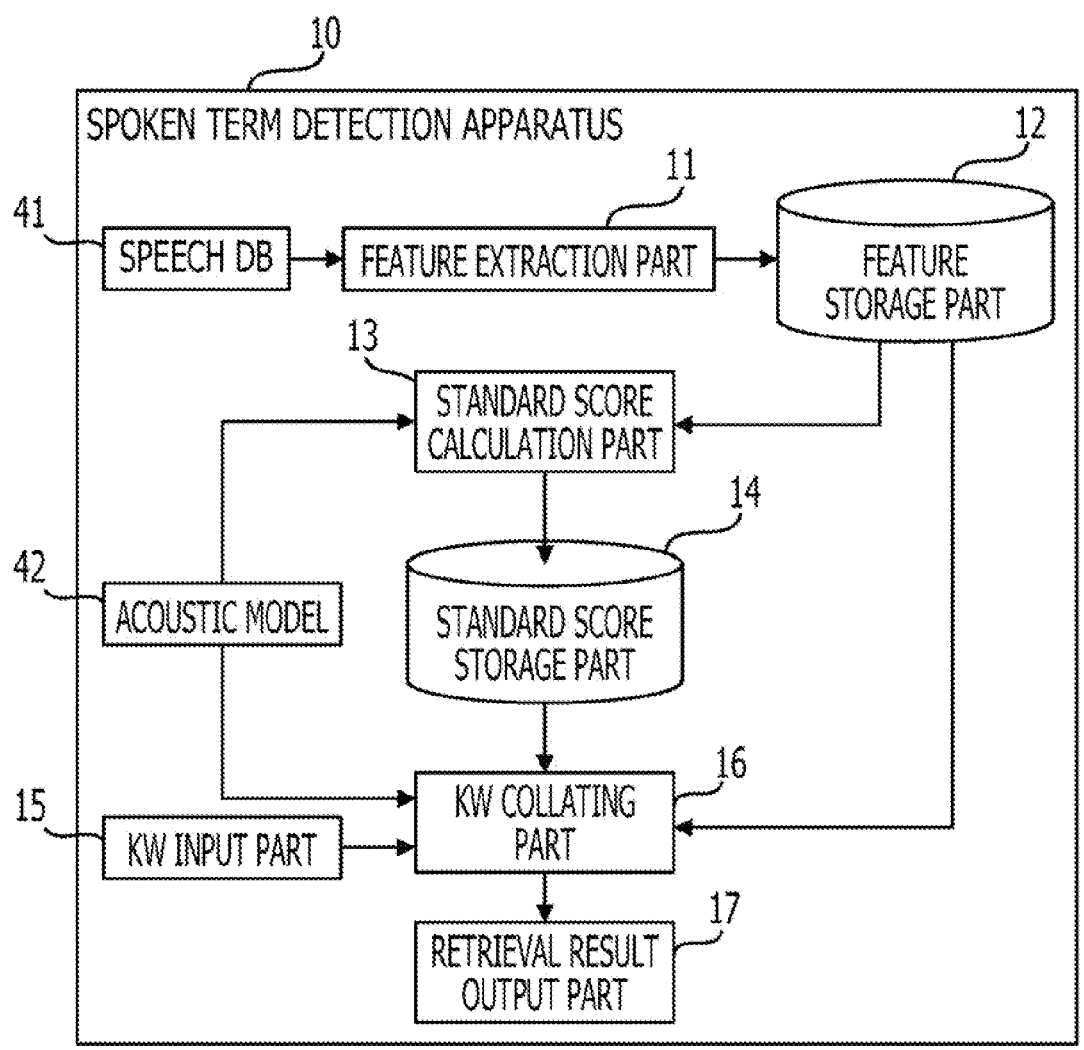
FIG. 2 is a block diagram illustrating the functions of the spoken term detection apparatus.

FIG. 2 is a block diagram illustrating the functions of the spoken term detection apparatus 10.

The spoken term detection apparatus 10 includes the functions of a feature extraction part 11 and a feature storage part 12. The feature extraction part 11 analyzes the speech data of the speech DB 41 and then extracts features therefrom in every unit of time T (e.g., 10 msec.). Hereinafter, the unit of time for extracting features will be referred to as a "frame". The feature extraction part 11 stores the extracted features in the feature storage part 12. Simultaneously, the feature extraction part 11 stores the extracted features as a feature vector row in the feature storage part 12.

FIG. 3 is a diagram schematically illustrating the feature vector row. The term "feature vector row" refers to one representing a feature of each frame for each of the speech IDs (0001, 0002, 0003, . . . ) by multi-dimensional vector quantities and aligning them in chronological order. The feature of each frame is provided with a pointer for referring the feature and managed by the correspondence list described below.

The spoken term detection apparatus 10 further includes the functions of a standard score calculation part 13 and a standard score storage part 14. The standard score calculation part 13 serves as an exemplary first calculation process. The standard score calculation part 13 calculates a standard score by matching (comparison) between the feature stored in the feature storage part 12 and the acoustic model 42, followed by storing the standard score in the standard score storage part 14. The standard score is a value representing the similarity between the feature and the acoustic model 42, which is calculated using the Hidden Markov Model (HMM), the DP matching method, the neural net, or the like. The standard score calculation part 13 performs the matching on the feature vector row illustrated in FIG. 3 from the first in order. If the speech data includes a noise or an ambiguous speech, for example, the standard score calculated by the standard score calculation part 13 will be comparatively low due to an increase in difference between the acoustic model 42 and the learned speech. In addition, if the speech data is from clearly pronounced speech, its sound is closer to the acoustic model 42. Thus, a standard score will be high. Both the feature extraction part 11 and the feature storage part 12 perform the above process with specified timing, for example when the spoken term detection apparatus 10 is powered on.

FIG. 4 is a diagram schematically illustrating a standard score. The standard score storage part 14 stores a standard score in each frame for each of the speech IDs (0001, 0002, 0003, . . . ) in chronological order. The standard scores of the respective frames are provided with pointers for referring to these standard scores and managed by a correspondence list described later.

The features and standard scores, which are stored in the feature storage part 12 and the standard score storage part 14, are managed by the correspondence list. FIG. 5 is a diagram schematically illustrating a corresponding list for referring to features and standard scores. The correspondence list illustrated in FIG. 5 brings a pointer, which indicates a point from which the speech ID starts, and the number of frames into correspondence with the speech ID. For example, when referring to a feature and a standard score of speech data with a speech ID of "0001", a pointer "1" illustrated in FIG. 3 and FIG. 4 is referenced and "1127622" frames are then referenced from the data of the pointer "1". In this embodiment, as illustrated in FIGS. 3 to 5, the correspondence relationship among the speech IDs, frames, features, and standard scores are managed by the list. Alternatively, however, it may be managed by any of other data structures, such as a tree structure.

The spoken term detection apparatus 10 has the functions of a keyword input part (hereinafter, referred to as a "KW input part") 15, a keyword collating part (hereinafter, referred to as a "KW collating part") 16, and a retrieval-result output part 17. The KW input part 15 inputs pronunciation information of a keyword, which is one the user wishes to retrieve, from the input part 6 using a keyboard or the like.

The KW collating part 16 performs an acceptance process for accepting the input keyword from the KW input part 15. The KW collating part 16 retrieves a section including the accepted keyword from speech data in the speech DB 41. In the following description, such retrieval is referred to as keyword retrieval. The KW collating part 16 performs keyword retrieval by frame for each speech ID. For example, the KW collating part 14 initiates a collation process for keyword retrieval from a first frame of the speech data with the speech ID "0001" and continuously performs the collation process for second, third, and other subsequent frames. After performing the keyword retrieval for all the frames of the speech data with the speech ID "0001", a retrieval process is performed on speech data with the speech IDs "0002", "0003", and other subsequent speech IDs. The KW collating part 16 outputs the speech ID and frame of the speech data to a retrieval-result output part 17 when detecting the speech data including the keyword. The retrieval-result output part 17 outputs the result of the keyword retrieval based on the output from the KW collating part 16. For example, a place where the retrieval target speech data is stored may be displayed on the spoken term detection apparatus 10. Alternatively, for example, the speech data may be output from a speaker.

Hereinafter, an exemplary process for keyword retrieval performed by the KW collating part 16 will be described.

For example, if a keyword to be retrieved is read as "aichi", then the KW collating part 16 extracts the corresponding phoneme string "a/i/ch/i" from the reading of the keyword. The KW collating part 16 compares the features of the frame section in which the presence of the keyword in the speech data is assumed with the model corresponding to the phoneme string "a/i/ch/i" in the acoustic model 42. This calculation process is an exemplary second acceptance process. The KW score R represents the likelihood that the keyword is sounded out in the section. For example, the HMM is used for the acoustic model 42, the likelihood calculated by the Viterbi algorithm may be used. Hereinafter, the start frame of the speech data related to the keyword is defined as a frame Fs and the ending frame as a frame Fe. Furthermore, for example, a KW score R between a frame A and a frame B is defined as a KW score R (A, B).

Here, in the case of a language having a system of syllabic writing, or a phonographic writing system, such as the Japanese language, reading is typically input with a phonogram string. The phonogram string is then converted into a phoneme string according to a fixed rule. On the other hand, in the case of a language without phonogram characters, such as the English language, may be considered in two different ways. One is to input the keyword by spelling it out and convert the pronunciation thereof into a phoneme string with reference to a pronouncing dictionary for each word. The other is to input the reading of the keyword using phonetic signs, such as those of SAMPA or IPA, and convert the phonetic string into a phoneme string. However, there is no need for conversion when phonetic signs, such as those of SAMPA or IPA, are directly employed as phonemic signs.

The KW collating part 16 calculates a KW score R (Fs, Fs') between a frame Fs and a frame Fe' (Fe'<Fe) of speech data related to the keyword. The frame Fe' is given as an initial value. Then, the KW collating part 16 sequentially increments the frame Fe' to the frame Fe, while calculating the KW score R (Fs, Fe') in each case. For example, the KW collating part 16 calculates a KW score R between a frame Fs and a frame (Fs+1) first and then calculates the KW score R between the frame Fs and the frame (Fs+2).

Furthermore, the KW collating part 16 calculates a frame normalization score S (Fs, Fe') by dividing the calculated KW score R (Fs, Fe') by the number of frames (Fe'−Fs+1) between the frame Fs and the frame Fe'. When the KW collating part 16 calculates a frame normalization score S (Fs, Fe') until the frame Fe' becomes the frame Fe, a section S (Fs, Fe") in which the frame normalization score becomes the best from the calculated frame normalization score S (Fs, Fe') is defined as the best score S (Fs).

For example, the KW collating part 16 acquires standard scores from the standard score storage part 14 from speech data with the speech ID "0001" in order. The KW collating part 16 acquires the same number of standard scores as that of the standard scores of the respective frames between the frame Fs and the frame Fe". For example, in the case of the frame Fs=1 and the frame Fe"=14, the KW collating part 16 acquires reference scores of the respective frames from the first one to the fourteenth one of the speech data with the speech ID "0001". Then, the KW collating part 16 calculates the sum Sa (Fs, Fe") by adding the acquired standard scores together. The KW collating part 16 calculates a normalized standard score Sb (Fs) through normalization by dividing the calculated sum Sa (Fs, Fe") by the number of frames (Fe"−Fs+1).

Figure 6:
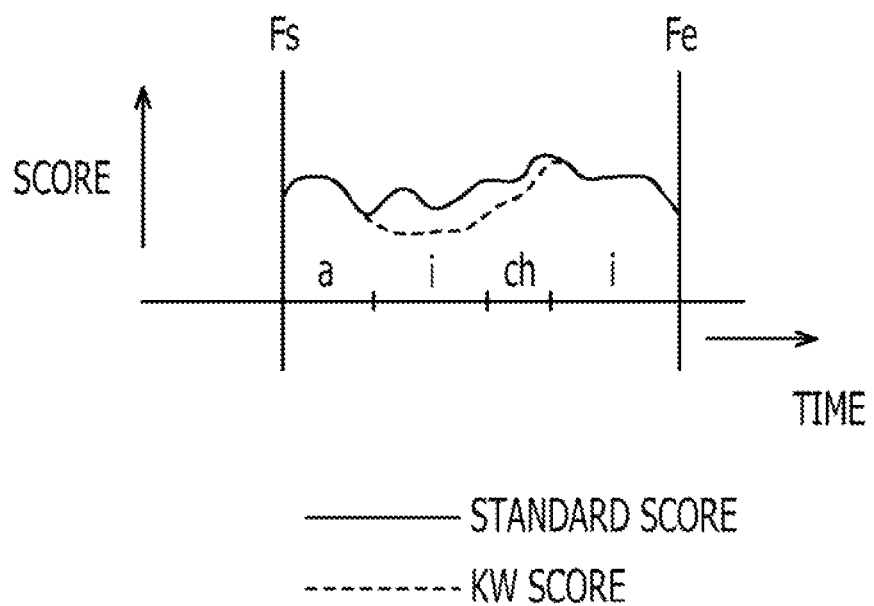
FIG. 6 is a schematic diagram illustrating a comparison between the best score S (Fs) and the normalized standard score Sb (Fs)

FIG. 6 is a schematic diagram illustrating a comparison between the best score S (Fs) and the normalized standard score Sb (Fs). FIG. 6 illustrates a case where a keyword "aichi" is used. In FIG. 6, the horizontal axis represents a time axis of speech data and the vertical axis represents the values of standard and KW scores. In addition, the solid line in the figure represents the path of plotted standard scores and the dashed line represents the trace of the KW score. The standard score is the similarity between the acoustic model 42 and the acoustic feature. The standard score is low when speech data is noisy and vague and high when the speech data is clear. In the present embodiment, the score of the highest-likelihood phoneme series is employed as a standard score. Thus, as illustrated in FIG. 6, KW scores are basically lower than standard scores.

Now, an exemplary retrieval process of the KW collating section 16 will be described. The KW collating part 16 makes a comparison between each of the calculated normalized standard scores Sb (Fs) and the best score S (Fs) to determine whether the resulting difference between them is higher than the threshold T. As described above, the standard score is the similarity between the acoustic model and the acoustic feature, which can be calculated from the highest-likelihood phoneme series. Thus, Sb (Fs)−S (Fs) is smaller than the threshold (specified value) T, when the difference between the normalized standard score Sb (Fs) and the best score (Fs). The possibility of the presence of the keyword "aichi" in the frames where the standard scores are acquired is high. Thus, it is determined that the speech data of the keyword "aichi" is present in the frames where the standard scores are acquired. If it is determined that the keyword is present, then the KW collating part 16 outputs the determined frame position as well as the speech ID of the speech data to the retrieval-result output part 17. The KW collating part continuously performs substantially the same process while incrementing the start frame Fs. However, if the keyword is detected in the section from the frame Fs to the frame F″, this section is skipped and the value of the next frame Fs is set to Fe″+1.

Furthermore, the threshold T may be suitably changed depending on an acoustic model 42 to be used, a feature to be calculated, and a process for calculating the KW score and so on. For example, the threshold T may be a value obtained by defining a threshold for each phoneme may be defined and stored in advance and then added with a threshold corresponding to the phoneme related to the calculation. For example, an exploratory experiment may be performed to investigate the tendency whether the feature of the phoneme of speech actually uttered can easily correspond to a standard score or hardly correspond thereto, followed by setting and storing a standard value d (x) ("x" is a phoneme) for each phoneme in advance. If the standard values of the phonemes "a", "i", and "u" are set to d (a)=2, d (i)=4, and d (u)=3, the phoneme "i" corresponds to the standard score more hardly than others. Then, when the keyword is retrieval, the standard values d (x) of phonemes corresponding to the standard scores between certain frames acquired by the KW collating part 16 are added together and provided as a threshold T. Alternatively, the keyword is retrieval, the sum of standard values d (x) corresponding to the respective phonemes in the keyword is served as a threshold. In this way, if the threshold T is determined with phonemes, the keyword retrieval can be performed more precisely.

When retrieving the keyword by the retrieval process in the KW collating part 16, a process for making a request of extracting acoustic features to the feature extraction process may be performed. Alternatively, a process for determining whether the speech data, which has not been extracted by the feature extraction process, is accumulated in the speech DB is performed. If it is being accumulated, a process for making a request of extracting acoustic features to the feature extraction process may be performed. Alternatively, a process for determining whether the speech data, from which an acoustic feature has not been extracted by the feature extraction process is stored in the acoustic feature storage part, is performed. When it is not stored, a process for a process for making a request of extracting acoustic features to the feature extraction process may be performed. Alternatively, a process for determining whether the speech data from which an acoustic feature has not been extracted by the feature extraction process is stored in the speech DB is performed. When the speech data is not stored in the acoustic feature storage part, a process for making a request of extracting acoustic features to the feature extraction process may be performed.

Figure 7:
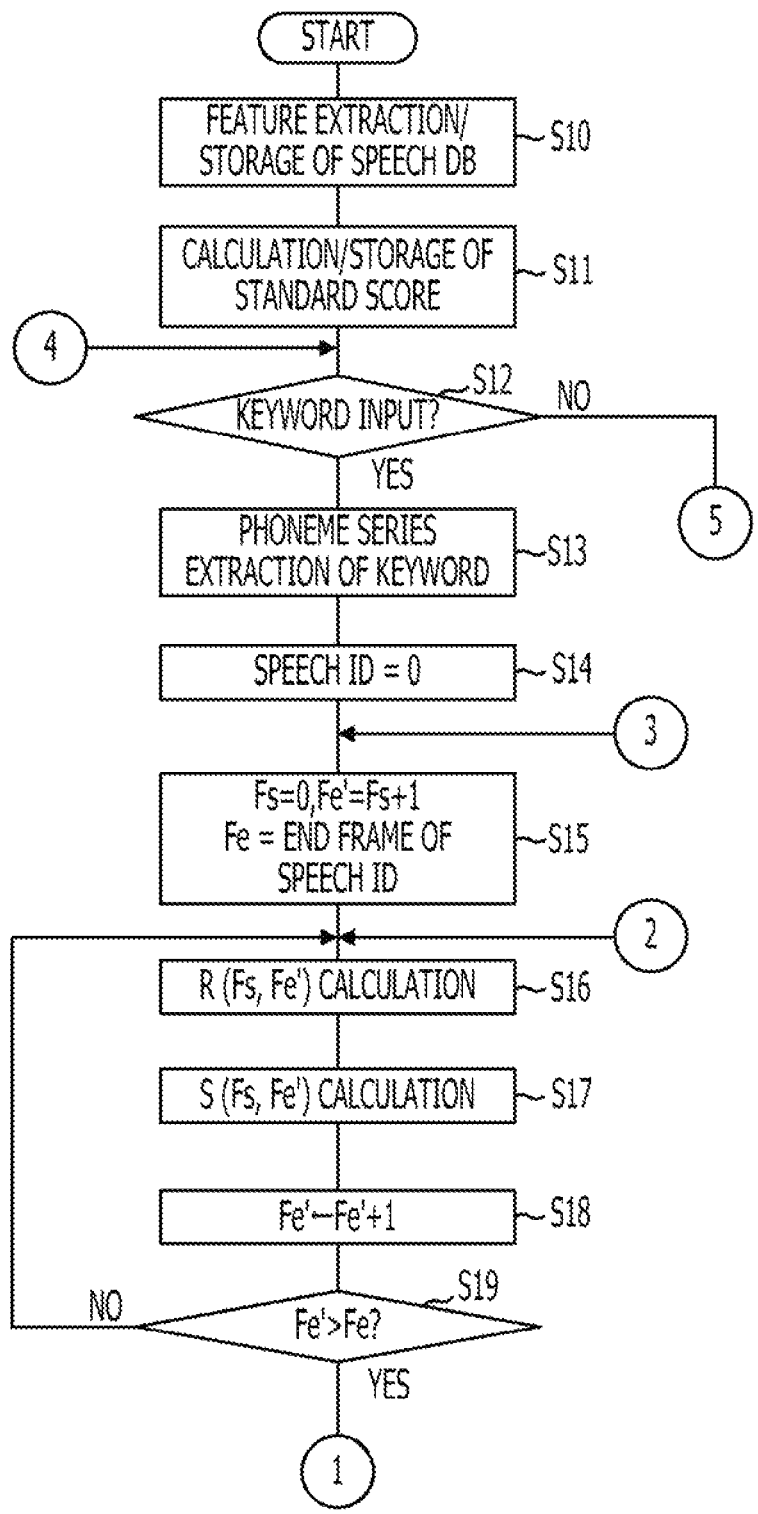
FIG. 7 is a flow chart illustrating the operations of a process performed in the spoken term detection apparatus.
Figure 8:
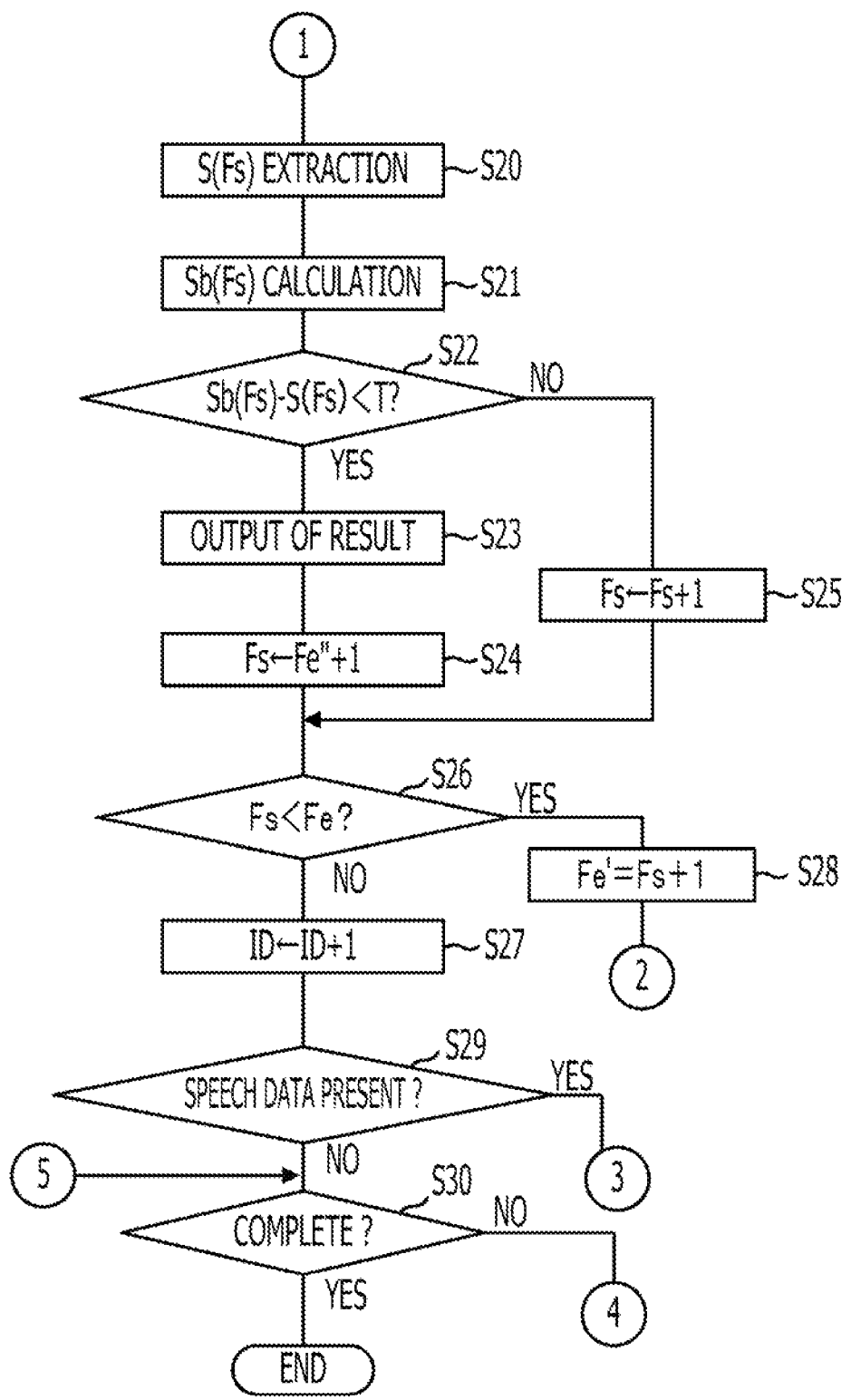
FIG. 8 is a flow chart illustrating the operations of a process performed in the spoken term detection apparatus.

Next, a process to be executed in the spoken term detection apparatus 10 will be described. FIG. 7 and FIG. 8 illustrate a flow chart illustrating the procedures of the process to be executed in the spoken term detection apparatus 10.

The power source of the spoken term detection apparatus 10 is switched on, then the CPU 1 analyzes the speech data of the speech DB 31 stored in the HDD 4 and a feature is then extracted every period of time T (e.g., 10 msec.), followed by storing the extracted feature in the HDD 4 or the like (S10). The CPU calculates a standard score by matching of the stored feature with the acoustic model 42 stored in the HDD 4, followed by storing the calculated standard score in the HDD 4 or the like (S11). The calculation of the standard score may be performed using any of the HMM, the DP-matching method, the neural net, and so on. The standard score may be calculated and stored before keyword retrieval to reduce the throughput performed at the time of the keyword retrieval. Thus, the keyword retrieval can be performed more quickly.

The CPU 1 determines whether a keyword is input or not (S12). If it is not input (S12: NO), then the CPU 1 executes the processing of the operation S30. If the keyword is input (S12: YES), then the CPU 1 extracts a phoneme string corresponding to the input keyword (S13). The CPU1 sets a speech ID to "0" (S14). Then, the CPU 1 sets the start frame Fs to "0 (zero)" as an initial value and the frame Fe' to "Fs+1" as well as the frame Fe to the value of the end frame with the speech ID ("0" at first) (S15).

Next, the CPU 1 compares the features between the frame Fs and the frame Fe' of the speech data related to the keyword with the feature of the acoustic model 42 to calculate a KW score R (Fs, Fe') (S16) and then calculates a frame normalization score S (Fs, Fe') (S17). The CPU 1 increments the frame Fe' (S18) to determine whether the frame Fe' becomes larger than the frame Fe (S19). If the frame Fe' is not larger than the frame Fe (S19; NO), the CPU 1 returns the process to the operation S16. If the frame Fe' becomes larger than the frame Fe (S19: YES), then the CPU 1 extracts the best score S (Fs) from the calculated frame normalization score S (Fs, Fe') (S20).

The CPU 1 acquires standard scores corresponding to between the frame Fs and the frame Fe″ and then obtains the sum Sa (Fs, Fe″) of these standard scores, followed by dividing the calculated Sa (Fs, Fe″) by the number of frames (Fe″−Fs+1) between the frame Fs and the frame Fe″ to calculate a normalized Sb (Fs) (S21). The CPU 1 makes a comparison between the calculated S (Fs) and the calculated Sb (Fs) to determine whether Sb (Fs)−S (Fs) is less than the threshold (S22).

If it is not less than the threshold T (S22: NO), then the CPU 1 determines that there is no keyword between the frame Fs and the frame Fe″ and then increments the value of the frame Fs (S25), followed by executing the processing of the operation S26. If it is less than the threshold T (S22: YES), then the CPU 1 determines that there is a strong possibility of the presence of the keyword between the frame Fs and the frame Fe″, followed by outputting the result based on the speech ID of the speech data as well as the frames Fs and Fe″ (S23). The output may be performed with speech or the like or with output on the screen of a display or the like. The CPU 1 skips the section between the frame Fs and the frame Fe″ in which the keyword has been detected. Thus, the CPU 1 sets a frame Fe″+1 as a next frame Fs (S24) and then proceeds the process to the operation S26.

The CPU 1 determines whether the start frame Fs is less than the end frame Fe, or whether the start frame Fs becomes the end frame Fe (S26). If the start frame Fs is less than the end frame Fe (S26: YES), then the CPU 1 sets a frame Fs+1 as a frame Fe' (S28) and then returns the process to the operation S16, followed by calculating the KW score R with respect to the next section.

If the start frame Fs is not less than the end frame Fe (S26: NO), then the value of the speech ID is incremented (S27). Subsequently, it is determined whether speech data corresponding to the next speech ID is present (S29). If there is speech data (S29: YES), then the CPU 1 returns the process to the processing of the operation S15 and then subjects the next speech ID to the same process. If there is no speech data (S29: NO), the CPU 1 determines whether the activation of the spoken term detection apparatus 10 is terminated, for example, when the power source thereof is switched off (S30). If it is not terminated (S30: NO), then the CPU 1 executes the operation S12. If it is completed (S30: YES), then the CPU1 ends this process.

In the present embodiment, as described above, when the keyword retrieval is performed, the standard scores calculated in advance and the keyword are used for executing. Since the standard score is independent from the keyword, it may be calculated and stored before starting the retrieval of the keyword. When calculating a standard score, the amount of throughput may be large because of extracting the features of speech data of the speech DB 41, retrieving the highest-likelihood phoneme series using all the phoneme models, and so on. Therefore, keyword retrieval can be performed using only phonemes related to a keyword by calculating a standard score in advance permits the keyword retrieval. For example, if a keyword used is "aichi" as described above, the corresponding phoneme string is "a/i/ch/i". Thus, only three phonemes may be used for the keyword retrieval, reducing the amount of calculation for the keyword retrieval. As a result, the process required for the keyword retrieval in the spoken term detection apparatus 10 can be performed at higher speed.

Furthermore, since the keyword retrieval is performed on the basis of the standard score served as that of the highest-likelihood phoneme series, the keyword can be detected more stably with high accuracy relative to the case where the detection is performed only with the best score S (Fs) related to the keyword, which may vary with the background noise environment or the user's speaking patterns.

Basically, furthermore, the KW score R is set to be lower than the standard score, if the standard score and the KW score R are calculated using different models, for example the monophone HMM or the GMM without any phoneme unit, and the KW score R is calculated using the triphone HMM, the best score S (Fs) may increase more than the normal standard score Sb (Fs). However, in the present embodiment, the keyword retrieval is performed by making a comparison (difference) between the best score S (Fs) and the normalized standard score Sb (Fs). Thus, the keyword retrieval can be performed in a stable manner. In FIG. 7 and FIG. 8, furthermore, the start frame Fs and the end frame Fe' in the section where the present of a keyword is assumed is entirely retrieved. Alternatively, an algorithm may be replaced with one in which the retrieval may be performed on the same retrieval space with a smaller amount of throughput by employing appropriate pruning or the like.

In the present embodiment, the keyword retrieval is performed using the standard scores previously calculated and stored. Alternatively, if the speech DB 41 includes sound data without the corresponding standard score when retrieving the keyword, the standard score of the corresponding speech data may be calculated when performing the keyword retrieval. Furthermore, a standard score may be calculated every time new speech data is added to the speech DB 41. In the present embodiment, furthermore, the features and the standard scores, which have been calculated in advance, are stored separately. Alternatively, for example, each piece of information may be additionally written on the speech data of the speech DB 41 and stored therein.

Another Embodiment

Hereafter, another embodiment will be described. In the aforementioned embodiment, the spoken term detection apparatus 10 includes one acoustic model 42. In contrast, the present embodiment includes two acoustic models. Hereafter, the description will be focused on the point of having two acoustic models.

Figure 9:
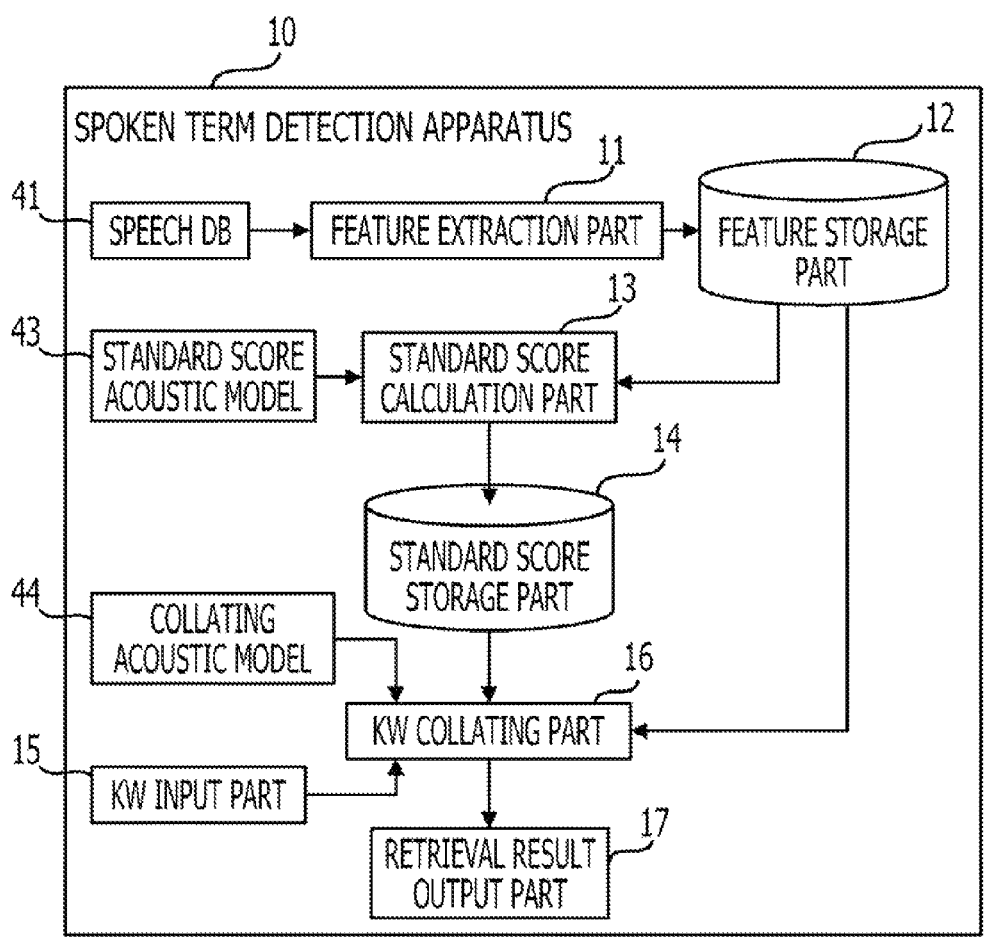
FIG. 9 is a block diagram illustrating the functions of the spoken term detection apparatus.

FIG. 9 is a block diagram illustrating the functions of the spoken term detection apparatus 10.

The spoken term detection apparatus 10 of the present embodiment includes substantially the same functions as those of the aforementioned embodiment. The HDD 4 includes a standard score acoustic model 43, and a collating acoustic model 44. The standard score acoustic model 43 used is a biphone or triphone model and referenced when the standard score calculation part 13 calculates a standard score. By employing the biphone- or triphone-type standard score acoustic model 43, the precision of the standard score can be improved and, as a result, a more precise keyword retrieval can be performed. Furthermore, the standard score is performed before the keyword retrieval. Thus, even if a biphone or triphone model is used for the standard score acoustic model 43, there is no influence on the keyboard retrieval. Furthermore, since the accuracy of the standard score can be increased, an increase in accuracy may be attained with another viewpoint, such as an increase in number of mixture distribution in the model.

The collating acoustic model 44 used is a monophone model and referred to when the KW collating part 16 extracts a KW score R input from the KW input part 15. By employing a monophone model as a collating acoustic model 44, the throughput of the KW collating part 16 is brought under control to reduce the processing time from being prolonged. As a result, a decrease in processing speed of keyword retrieval can be reduced. When the processing speed is satisfactory in resource, the acoustic model to be used may be a high definition model, such as a biphone or triphone model.

Furthermore, the processing in the spoken term detection apparatus 10 of the present embodiment is similar to that of the aforementioned embodiment, so that the description thereof will be omitted.

As described above, in the present embodiment, the calculation of standard scores and the keyword retrieval employs different acoustic models, respectively. Therefore, a biphone or triphone model or the like may be used for the keyword retrieval acoustic model 43, which will not affect on keyword retrieval even if its throughput increases, to enhance the accuracy of keyword retrieval. Furthermore, a monophone model may be used for the collating acoustic model 44 to be used for keyword retrieval, which requires high processing speed, to make the processing speed of the keyword retrieval higher.

Another Embodiment

Hereinafter, another embodiment will be described. In this embodiment, two languages, Japanese and English, are provided as keyword search targets.

Figure 10:
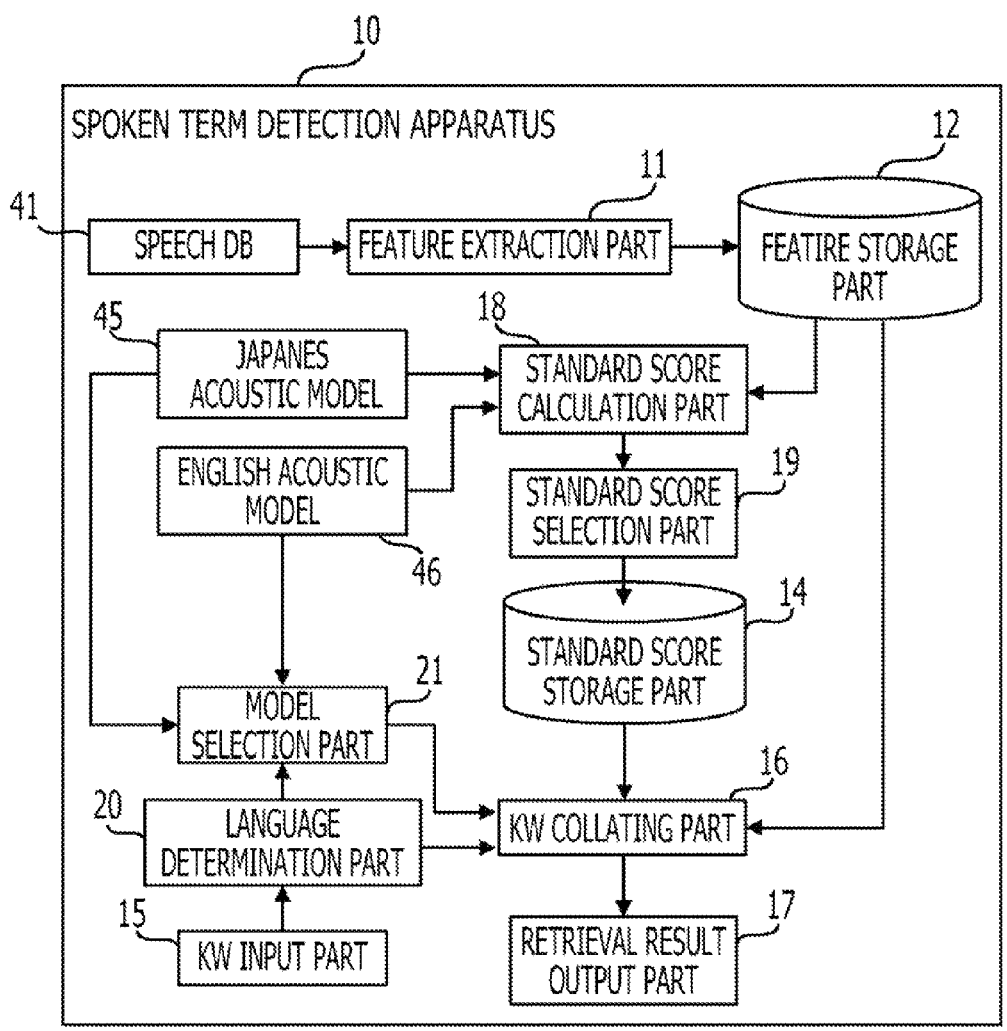
FIG. 10 is a block diagram illustrating the functions of the spoken term detection apparatus.

FIG. 10 is a block diagram illustrating the functions of a spoken term detection apparatus 10.

A spoken term detection apparatus 10 includes the functions of a feature extraction part 11, a feature storage part 12, a standard score storage part 14, a KW input part 15, a KW collating part 16, a standard score selection part 19, a language determining part 20, a model selection part 21, and so on. In addition, the spoken term detection apparatus 10 stores a Japanese acoustic model 45 and an English acoustic model 46 in the HDD 4.

Figure 11:
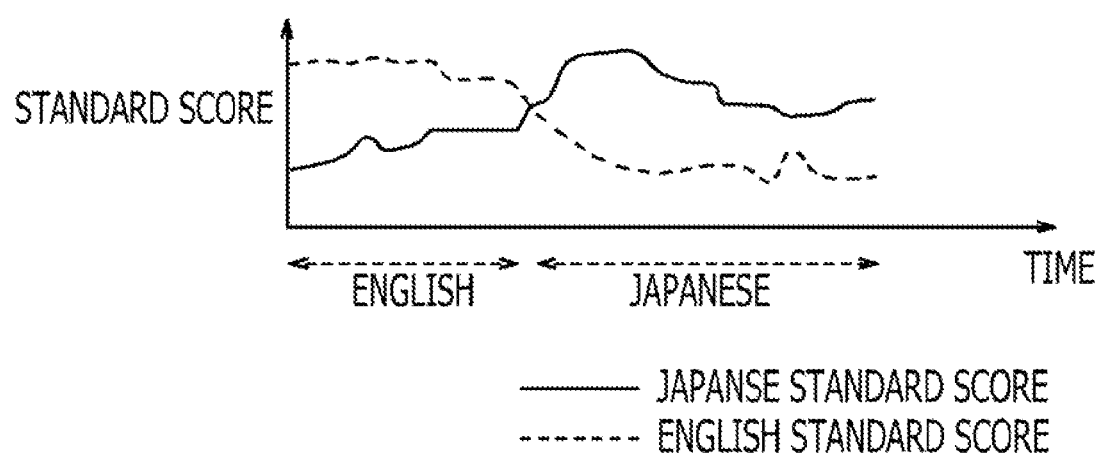
FIG. 11 is a diagram illustrating exemplary standard cores calculated for different languages.

The standard score calculation part 18 calculates standard scores for the languages, respectively, in the speech data of the speech DB 41. FIG. 11 is a diagram illustrating exemplary standard scores calculated for different languages. In FIG. 11, a horizontal axis is the time axis of speech data and the vertical axis represents the values of standard scores. In FIG. 11, furthermore, the solid line represents the trace of standard scores calculated with a Japanese acoustic model 45 and the dashed line represents the path of plotted standard scores calculated with an English acoustic model 46. As illustrated in FIG. 11, since the standard score calculation part 18 calculates separately the standard scores of the respective languages, it is possible to determine which language the standard score is high (good) and which frame section where such a high standard score is attained. As a result, it is possible to grasp which language is spoken in every frame of speech data.

The standard score selection part 19 selects the language with the best score in any section and then stores the selected language in the standard score storage part 14 together with the standard score. Thus, any language being spoken in any speech section can be stored.

The language determining part 20 determines whether the keyword input from the KW input part 14 is English or Japanese. The language determining part 20 determines that, for example, the keyword is English if it includes alphabets or the keyword is Japanese if it includes Chinese characters or with Katakana characters. The language determining part 20 may determine automatically or may determine with acceptance of user's selection operation. The model selection part 21 selects a Japanese acoustic model 45 or an English acoustic model 46 in response to the result of the determination in the language determining part 20 and employs it as an acoustic model to be used.

The KW collating part 16 compares the determination result in the language determining part 20 with the language stored in the standard score storage part 15, followed by using a section where the language is matched to perform keyword retrieval using an acoustic model selected by the model selection part 21. The process of keyword retrieval performed by the KW collating part 16 is substantially the same as one performed in the aforementioned embodiment.

Figure 12:
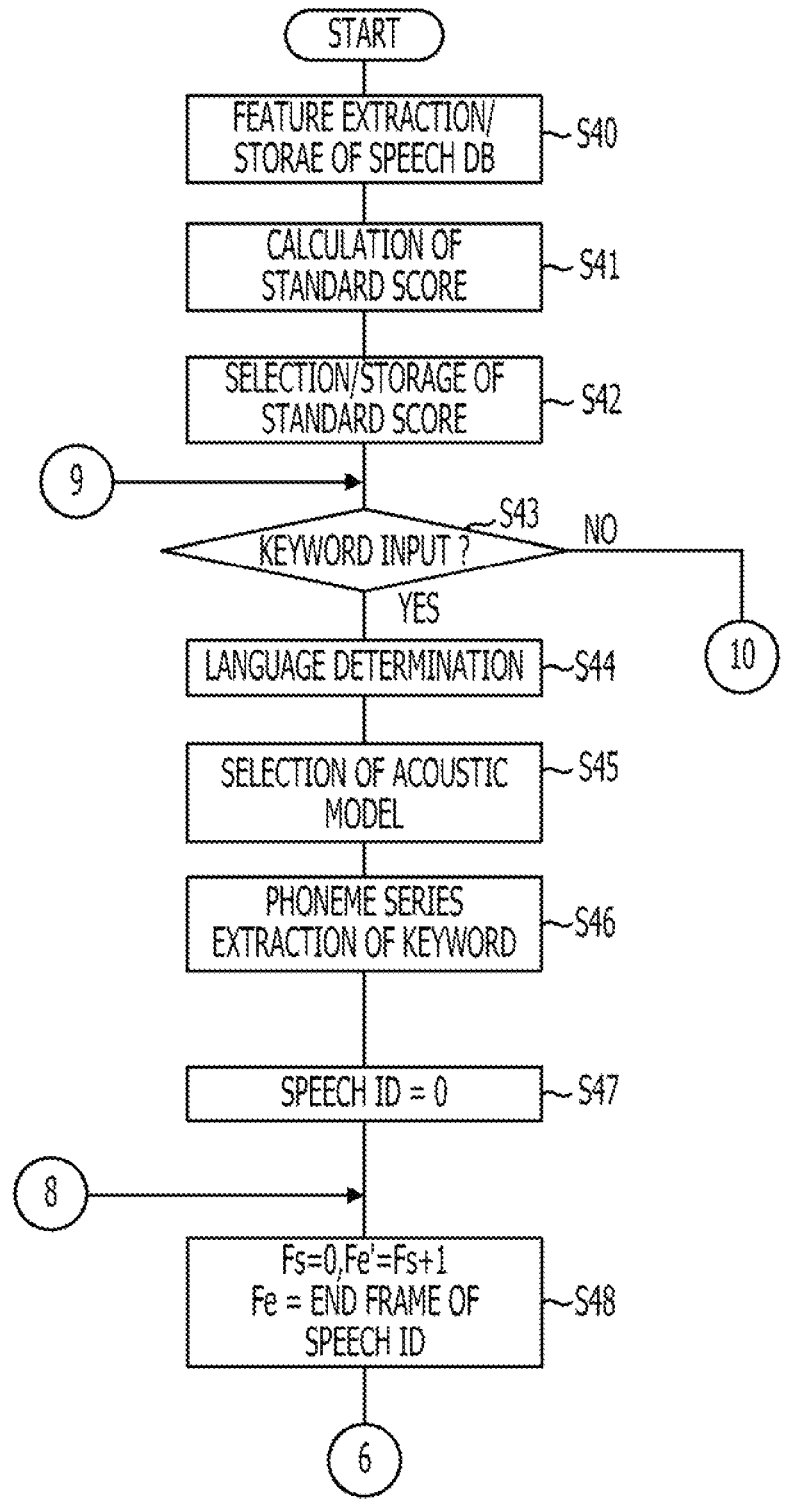
FIG. 12 is a flow chart illustrating the operations of a process performed in the spoken term detection apparatus.
Figure 13:
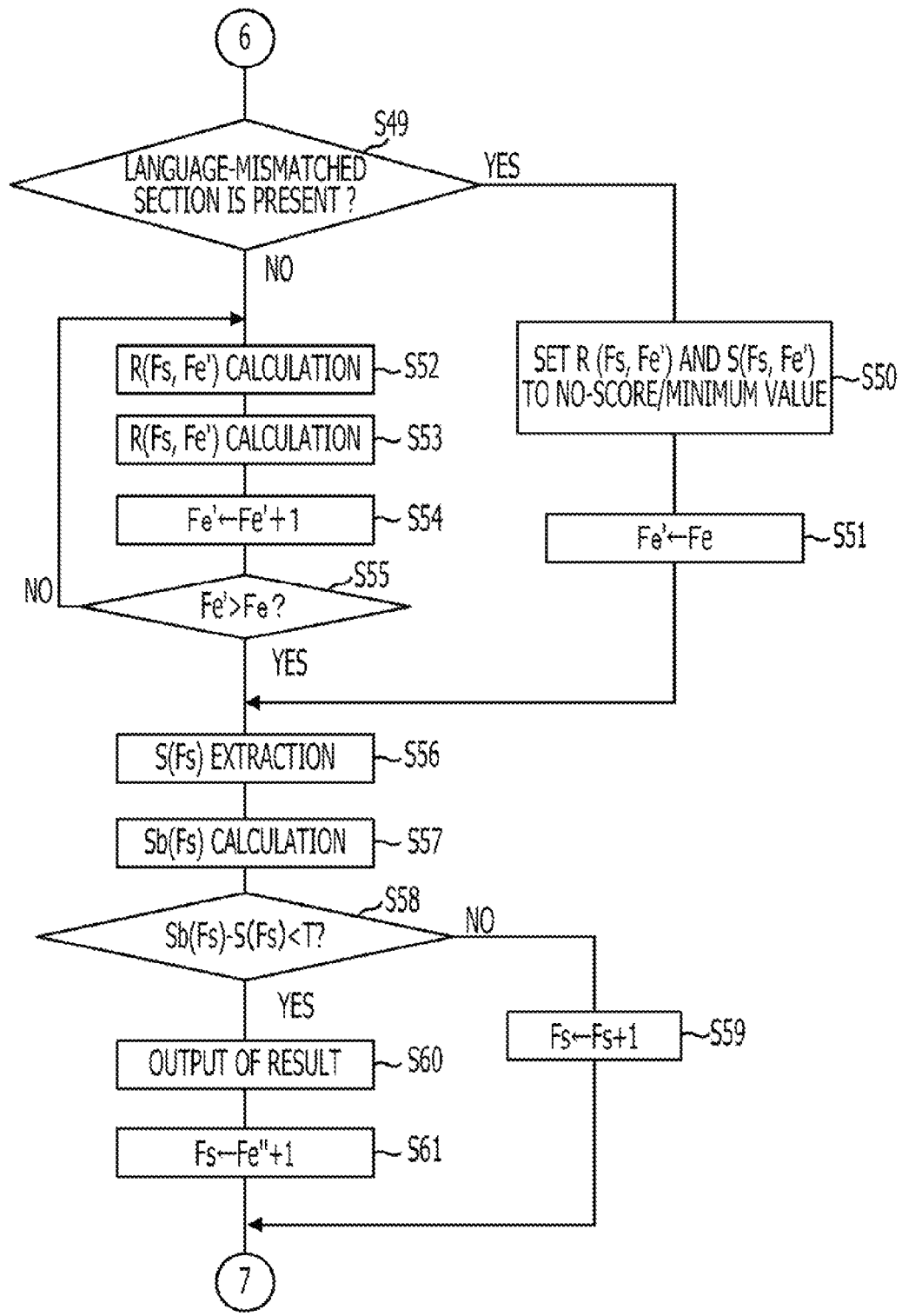
FIG. 13 is a flow chart illustrating the operations of a process performed in the spoken term detection apparatus.
Figure 14:
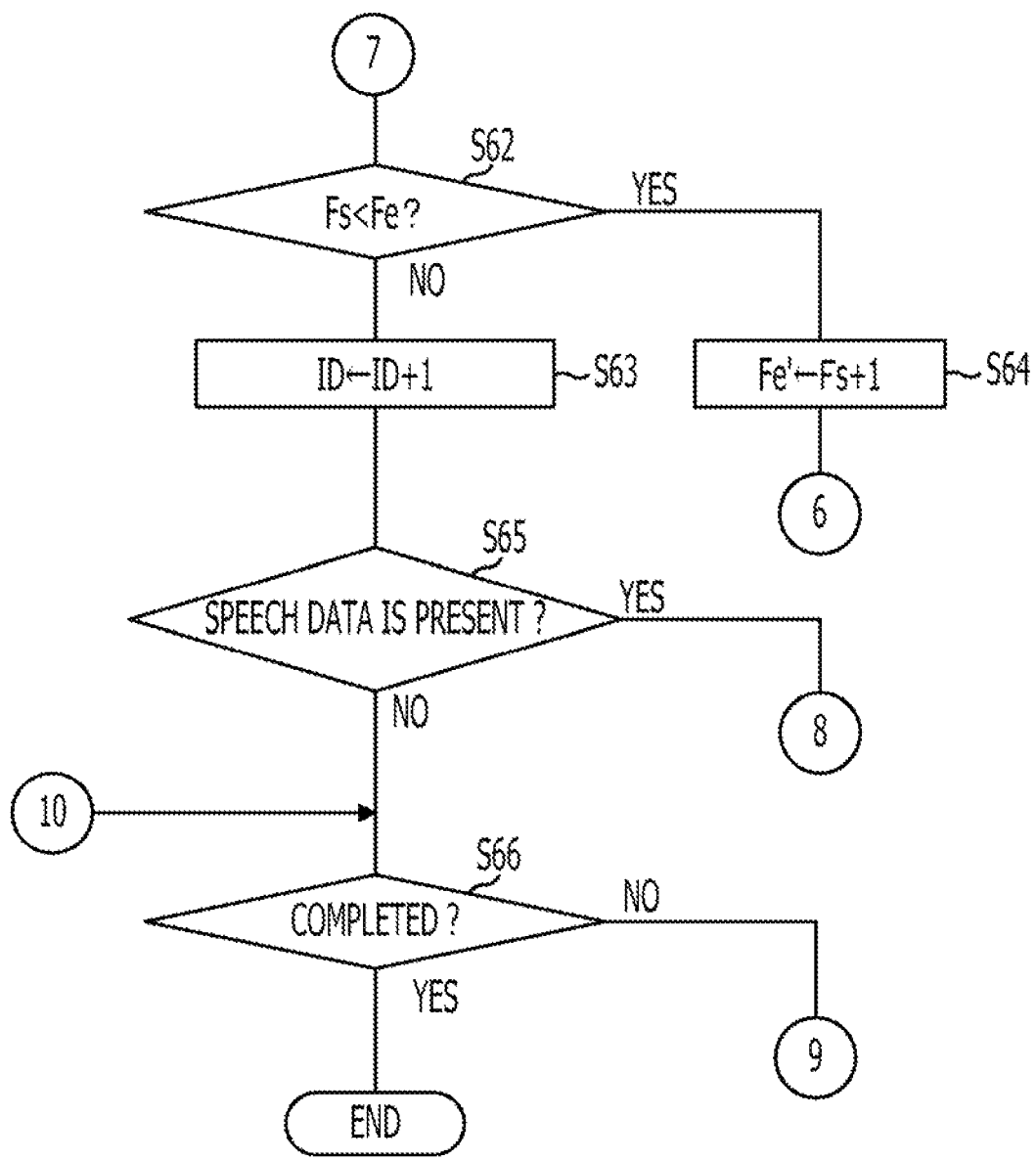
FIG. 14 is a flow chart illustrating the operations of a process performed in the spoken term detection apparatus.

Hereinafter, a process performed in the spoken term detection apparatus 10 will be described. FIG. 12, FIG. 13, and FIG. 14 are diagrams each illustrating a flow chart representing a process to be executed in the spoken term detection apparatus 10.

The power source of the spoken term detection apparatus 10 is switched on, then the CPU 1 analyzes the speech data of the speech DB 41 stored in the HDD 4 and a feature is then extracted every period of time T (e.g., 10 msec.), followed by storing the extracted features in the HDD 4 or the like (S40). The CPU 1 performs matching of the Japanese acoustic model 45 or the English acoustic model 46 stored in the HDD 4 with the stored feature to calculate standard scores for each language (S41). Based on the calculation result of the standard score, the CPU 1 selects which language the best score is attained and which section such a best score is found, followed by storing the selected language with the standard score in the HDD 4 (S42).

The CPU 1 determines whether the keyword is input or not (S43). If it is not input (S43: NO), the CPU 1 executes the processing of S66. If the keyword is input (S43: YES), the CPU 1 determines whether the keyword is English or Japanese (S44) and then selects the Japanese acoustic model 45 or the English acoustic model 46 from the result of the determination (S45).

Next, the CPU 1 extracts a phoneme string corresponding to the input keyword (S46). The CPU 1 sets the speech ID to "0" (S47). Next, the CPU 1 sets the start frame Fs to "0 (zero)" as an initial value and the frame Fe" to "Fs+1" as well as the frame Fe to the value of the end frame with the speech ID ("0" at first) (S48).

Next, the CPU 1 determines whether the section from the frame Fs to the frame Fe' includes the result of the language determination and a section with a mismatch between the stored standard score and the language (S49). If it includes such a mismatched section (S49: YES), then the CPU 1 sets the KW score R (FS, Fe') and the frame normalization score S (Fs, Fe') to "no score" or set to the specified lowest value (S50). Thus, a language-mismatched section may be not considered as a retrieval target. Subsequently, since the language is mismatched even when the section from the frame Fs to the frame Fe' is subjected to the processing, the CPU 1 sets the value of the frame Fe' into the vale of the frame Fe (S51), followed by proceeding the process to the processing of S56.

On the other hand, in S49, if the mismatched section is not included (S49: NO), then the CPU 1 compares the feature between the frame Fs and the frame Fe' of the speech data related to the keyword with the feature of the acoustic model 42 to calculate the KW score R (Fs, Fe') (S52), followed by calculating the frame normalization score S (Fs, Fe') (S53). The CPU 1 increments the frame Fe' (S54) and then determines whether the frame Fe' becomes larger than the frame Fe (S55). If the frame Fe' is not larger than the frame Fe (S55: NO), then the CPU 1 proceeds the process to the processing of S52. If the frame Fe' becomes larger than the frame Fe (S55: YES), then the CPU 1 extracts the best score S (Fs) from the calculated frame normalization score S (Fs, Fe') (S56).

Next, the CPU 1 acquires a standard scores corresponding to between the frame Fs and the frame Fe" and then obtains the sum Sa (Fs, Fe") of these standard scores, followed by dividing the calculated Sa (Fs, Fe") by the number of frames (Fe"−Fs+1) between the frame Fs and the frame Fe" to calculate a normalized Sb (Fs) (S57). The CPU 1 makes a comparison between the calculated S (Fs) and the calculated Sb (Fs) to determine whether Sb (Fs)−S (Fs) is less than the threshold (S58).

If it is not less than the threshold T (S58: NO), then the CPU 1 determines that there is no keyword between the frame Fs and the frame Fe" and then increments the value of the frame Fs (S59), followed by executing the processing of the operation S62. If it is less than the threshold T (S58: YES), then the CPU 1 determines that there is a strong possibility of the presence of the keyword between the frame Fs and the frame Fe", followed by outputting the result based on the speech ID of the speech data as well as the frames Fs and Fe" (S60). The output may be performed with speech or the like or with output on the screen of a display or the like. The CPU 1 skips the section between the frame Fs and the frame Fe" in which the keyword has been detected. Thus, the CPU 1 sets a frame "Fe"+1" as a next frame Fs (S61) and then the process proceeds to the operation S62.

The CPU 1 determines whether the start frame Fs is less than the end frame Fe, or whether the start frame Fs becomes the end frame Fe (S62). If the start frame Fs is less than the end frame Fe (S62: YES), then the CPU 1 sets the frame Fe' to Fs+1 (S64) and then returns the process to the operation S49, followed by calculating substantially the same processing with respect to the next section.

If the start frame Fs is not less than the end frame Fe (S62: NO), then the value of the speech ID is incremented (S63). Then, it is determined whether speech data corresponding to the next speech ID is present (S65). If there is speech data (S65: YES), then the CPU 1 returns the process to the processing of the operation S48 and then subjects the next speech ID to the same process. If there is no speech data (S65: NO), the CPU 1 determines whether the activation of the spoken term detection apparatus 10 is terminated, for example, when the power source thereof is switched off (S66). If it is not terminated (S66: NO), then the CPU 1 performs S43. If it is terminated (S66: YES), then the CPU 1 completes the present process.

As described above, in the present embodiment, an acoustic model for a single language is used in the keyword retrieval even if a plurality of languages is accessible. The process of keyword retrieval is performed on the section where the corresponding language is being spoken. By performing the keyword retrieval using a plurality of acoustic models, the keyword retrieval can be performed with high accuracy at high speed.

Furthermore, in the present embodiment, description has been made of the keyword retrieval of two languages, Japanese and English. However, the kinds and number of languages are not limited to specific ones. Furthermore, the standard scores to be stored may be not limited to those of one language. A plurality of higher ranked (N best) standard scores may be selected and stored. In this case, a KW score R (Fs, Fe') is calculated at a section where the determination result of the language determination part 20 corresponds to any of a plurality of languages stored in the standard score storage part 14. Furthermore, a frame normalization score S (Fs, Fe') is calculated. Therefore, the number of choices increases in the speech section to be served as a retrieval target and the probability of error in determination of a language by which speech data is being uttered can be reduced. Thus, the keyword retrieval with higher accuracy can be performed. Furthermore, similar to the aforementioned embodiment, the acoustic model used for calculation of standard scores and the acoustic model used for keyword retrieval may be those different from each other.

As described above, the embodiments have been described in detail. However, the configurations, operations, and so on of these embodiments can be suitably changed and not limited to those described above.

Programs described in the aforementioned embodiments may be distributed by being stored in a computer-readable storage medium. Here, examples of the computer-readable storage medium include nonvolatile storage media, such as a flexible disk, a hard disk, a compact disc-read only memory (CD-ROM), a magneto optical disk (MO), a DVD, a DVD-ROM, a DVD-random access memory (DVD-RAM), Blu-ray® disc (BD), a USB memory, and a semiconductor memory. The computer program may be transmitted via an electric telecommunication line, a radio or wire communication line, and a network typified by the Internet. Note that the computer-readable medium does not include any carrier wave in which a computer program is embedded. Even if any computer program, which can be transmitted by being embedded in a carrier wave, is used, there is a readable storage medium mounted on a computer from which such a program can be transmitted. Thus, the computer-readable storage medium refers to a physically substantial storage medium.

All examples and conditional language recited herein are intended for pedagogical purposes to aid the reader in understanding the principles of the invention and the concepts contributed by the inventor to furthering the art, and are to be construed as being without limitation to such specifically recited examples and conditions. Although the embodiment(s) of the present invention(s) has (have) been described in detail, it should be understood that the various changes, substitutions, and alterations could be made hereto without departing from the spirit and scope of the invention.

What is claimed is:

1. A spoken term detection apparatus, comprising:
a storage unit and a processor, wherein
the storage unit includes
an accumulation part to accumulate speech data of a retrieval target,
an acoustic model storage section to store an acoustic model retaining a characteristic in an acoustic feature space for each unit of speech recognition,
an acoustic feature storage to store an acoustic feature extracted from the speech data, and
a standard score storage part to store a standard score calculated from a similarity between the acoustic feature and the acoustic model, wherein processing performed by the processor includes
a feature extraction process to extract an acoustic feature from speech data accumulated in the accumulation part and store an extracted acoustic feature in the acoustic feature storage,
a first calculation process to calculate the standard score from a similarity between an acoustic feature stored in the acoustic feature storage and an acoustic model stored in the acoustic model storage part,
an acceptance process to accept an input keyword,
a second calculation process to compare an acoustic model corresponding to an accepted keyword with the acoustic feature stored in the acoustic feature storage part to calculate a score of the keyword, and
a retrieval process to retrieve speech data including the keyword from speech data accumulated in the accumulation part based on the score of the keyword calculated by the second calculation process and the standard score stored in the standard score storage part, wherein
the standard score equates to the highest-likelihood phoneme series.

2. The spoken term detection apparatus according to claim 1, wherein
the feature extraction process divides speech data by specified time T, and extract an acoustic feature of speech data for each time T,
the first calculation process calculates the similarity for each time T, and
the standard score storage part stores the similarity calculated by the first calculation process for each time T, and the retrieval process compares the score calculated by the second calculation process with the standard score stored in the standard score storage part by the time T so as to retrieve the speech data.

3. The spoken term detection apparatus according to claim 1, wherein
the acoustic model storage part stores a plurality of acoustic models, and the first calculation process and the second calculation process are able to use different acoustic models, respectively.

4. The spoken term detection apparatus according to claim 1, further comprising:
- a language determination process to determine a language that corresponds to the accepted keyword, wherein
- the accumulation part accumulates speech data including a plurality of languages,
- the acoustic model storage part stores an acoustic model corresponding to each of the plurality of languages,
- the feature extraction process extracts an acoustic feature of the speech data for each language,
- the first calculation process calculates a score of the speech data for each language by using each acoustic model,
- the standard score storage part stores top N (N>1) scores among scores calculated for each language by the first calculation process, and
- the retrieval process is stored in the standard score storage part and performs retrieval using a score corresponding to the language determined by the language determination process.

5. The spoken term detection apparatus according to claim 1, wherein
- when a difference between the score of the keyword calculated by the second calculation process and the score stored in the standard score storage part in an arbitrary section of the speech data is not more than a threshold or less than the threshold, the section is retrieved as a keyword-existing section.

6. The spoken term detection apparatus according to claim 5, further comprising:
- an adjusting process to adjust the threshold in response to a phoneme of the stored score.

7. The spoken term detection apparatus according to claim 5, further comprising:
- an adjusting process to adjust the threshold in response to a phoneme of the score calculated by the second calculation process.

8. The spoken term detection apparatus according to claim 1, wherein
- the feature extraction process extracts an acoustic feature from newly accumulated speech data every time the new speech data is accumulated in the accumulation part.

9. The spoken term detection apparatus according to claim 1, further including:
- a determination process to determine whether speech data from which the feature extraction process does not extract an acoustic feature is accumulated in the accumulation part when the retrieval process performs retrieval, and
- a request process to request extraction of an acoustic feature to the feature extraction process when it is determined that there is no accumulation.

10. A spoken term detection method of retrieving speech data including an accepted keyword using an acoustic model holding a characteristic in an acoustic feature space for each unit of speech recognition, comprising:
- extracting an acoustic feature from accumulated speech data;
- storing an extracted acoustic feature in an acoustic features storing device;
- calculating a standard score from a similarity between a stored acoustic feature and an acoustic feature defined by a stored acoustic model;
- storing the calculated standard score;
- accepting a keyword;
- calculating a score of a keyword by comparing an acoustic model corresponding to the keyword with the acoustic feature stored in the acoustic features storing device; and
- executing a process for retrieving speech data including the keyword from the accumulated speech data, based on a calculated score of the keyword and the standard scored, wherein
- the standard score equates to the highest-likelihood phoneme series.

11. A computer-readable storage medium storing a program to be executed by a computer, wherein
- the program is a program to be executed by a computer in which speech data is accumulated by an accumulation device and an acoustic model retaining a characteristic in an acoustic feature space for each unit of speech recognition is stored in an acoustic features storing device, and the program allows the computer to execute:
- an extraction process for extracting an acoustic feature from the accumulated speech data;
- a first calculation process for calculating a standard score from a similarity between the extracted acoustic feature and an acoustic feature defined by the stored acoustic model;
- a second calculation process for comparing an acoustic model corresponding with the acoustic feature stored in the acoustic features storing device to calculate an accepted keyword to calculate a score of the keyword; and
- a retrieval process for retrieving speech data including the keyword from speech data accumulated in the accumulation device based on the score of the keyword calculated by the second calculation process and the calculated standard scored, wherein
- the standard score equates to the highest-likelihood phoneme series.

* * * * *